Sept. 29, 1970   A. E. SCHMIDLIN ET AL   3,530,725
ANGULAR RATE SENSOR
Filed July 17, 1968

INVENTORS
ALBERTUS E. SCHMIDLIN &
EDWARD L. RAKOWSKY

BY
ATTORNEY

United States Patent Office 3,530,725
Patented Sept. 29, 1970

3,530,725
ANGULAR RATE SENSOR
Albertus E. Schmidlin, Caldwell, and Edward L. Rakowsky, Kinnelon, N.J., assignors to Singer-General Precision, Inc., Little Falls, N.J., a corporation of Delaware
Filed July 17, 1968, Ser. No. 745,489
Int. Cl. G01p 3/26
U.S. Cl. 73—505          5 Claims

ABSTRACT OF THE DISCLOSURE

An angular rate sensor comprising a housing rotatable about its axis and having an inlet and an outlet for fluid. Means are provided to impart a circumferential velocity to the fluid as it passes through the outlet, which circumferential velocity is varied in response to an input rate. The input rate is detected by measuring the flow rate through the outlet.

BACKGROUND OF THE INVENTION

This invention relates to an angular rate sensor and, more particularly, to such a sensor utilizing a circulating fluid system to sense angular rate.

It has been proposed to provide fluid devices to sense angular rate. These devices basically provided for an ideal sink flow between two coaxial discs rotating about their axes, which sink flow velocity is proportional to the rotation. A vortex is created in the sink and the amplification of the circumferential velocity in this vortex will give an output signal directly proportional to the angular rate. However, the amplified circumferential velocity is usually sensed through pick-off devices which sense the pressure associated with the flow velocity, and since the output pressure and flow are relatively small, multiple stages of subsequent amplification are required, which substantially degrades the quality of the output signal.

SUMMARY OF THE INVENTION

It is therefore an object of the present invention to provide an angular rate sensor which utilizes a fluid system, and which provides an output signal of a magnitude which eliminates multiple stages of amplification, and therefore provides a high quality output signal.

Briefly summarized, the present invention comprises a housing having a fluid inlet and at least one sink outlet formed therein. Means are provided to impart an initial circumferential velocity to the fluid as it passes through the outlet, which velocity varies in proportion to the angular rate imparted to the device, so that a flow rate is effected through the outlet in proportion of the angular input rate which may be amplified and measured.

BRIEF DESCRIPTION OF THE DRAWINGS

Reference is now made to the accompanying drawings for a better understanding of the nature and objects of the sensor of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
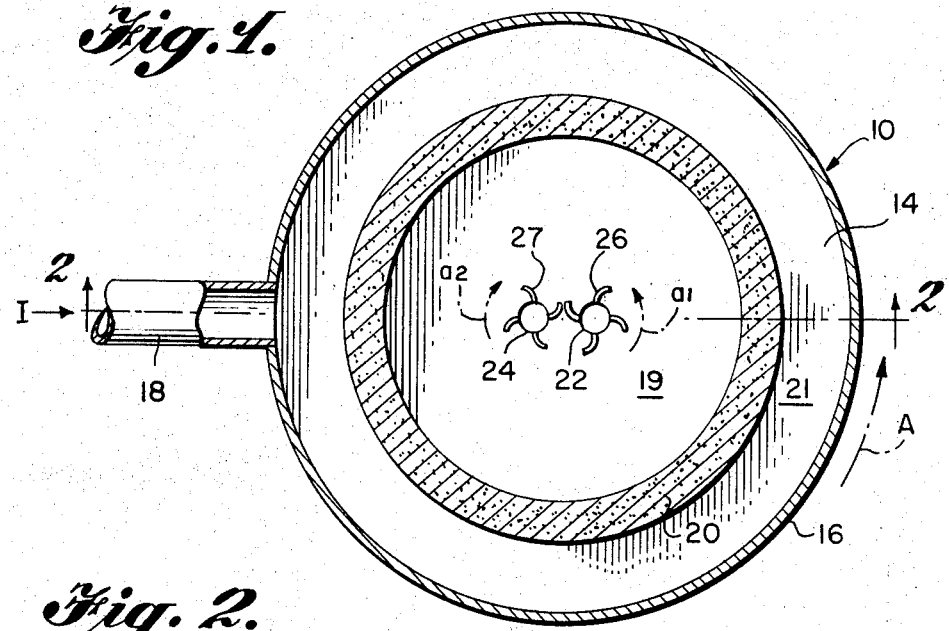
FIG. 1 is a horizontal cross-sectional view of the angular rate sensor of the present invention.
Figure 2:
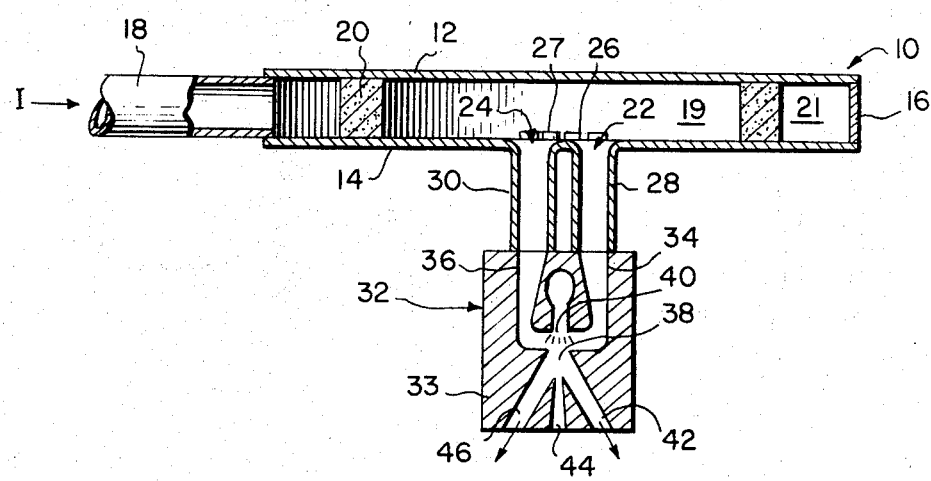
FIG. 2 is an transverse cross-sectional view, taken along line 2—2 of FIG. 1.

Referring specifically to FIGS. 1 and 2 which depict the angular rate sensor of the present invention, the reference numeral 10 refers to a cylindrical housing which is formed by a pair of coaxially spaced discs 12 and 14, and an outer wall 16. An inlet conduit 18 extends between the two discs and is disposed radially inwardly from the wall 16 to define an inner chamber 19 and an outer chamber 21.

A pair of sink outlets 22 and 24 for the inner chamber 19 are provided through the disc 14, and a set of spiral ridges 26 and 27 are formed on the inner face of the disc 14 and terminate at the outlets 22 and 24, respectively, the ridges 26 extending in an opposite direction to the ridges 27. A pair of outlet conduits 28 and 30 register with the sink outlets 22 and 24, respectively.

A proportional flueric amplifier 32 is shown in FIG. 2 and consists of a housing 33 having a pair of inlets 34 and 36 registering with the outlet conduits 28 and 30, respectively. The inlets 34 and 36 in turn register with a central conduit 38, and a power jet 40 is disposed at one end of the latter. Outlets 42, 44 and 46 register with the conduit 38, as shown.

In operation, a fluid is passed into the outer chamber 21 at a constant rate through the inlet conduit 18. As the outer chamber fills up, the fluid will pass through the porous cylinder 20 and into the inner chamber 19 whereupon it will enter between the spiral ridges 26 and 27, will form a vortex adjacent the mouth of each of the sink outlets 22 and 24, and will begin to exit by swirling through the outlets in the directions indicated by the arrows $a_1$ and $a_2$, respectively.

Upon an angular rate being imparted to the housing 10 in the direction indicated by the arrow A, for example, an additional swirl, or circumferential velocity will be imparted to the fluid flowing through the sink outlet 22, since the direction of the angular rate is the same as that of the initial circumferential velocity $a_1$. Therefore, the net circumferential velocity through the sink outlet 22 will be $a_1 + A$.

However, since the spiral ridges 27 impart a circumferential velocity to the fluid through the sink outlet 24 in a direction $a_2$ which is opposite to that of the angular rate A, the net circumferential velocity in this sink outlet will be $a_2 - A$.

Since the actual flow through the sink outlets is inversely proportional to the magnitude of the circumferential velocity of the fluid therein, the flow through the sink outlet 22 will be smaller due to the increased circumferential velocity of the fluid therein, and the flow through the sink outlet 24 will be larger due to the decreased circumferential velocity of the fluid therein.

The above flow through the sink outlets 22 and 24 then passes through the outlets 28 and 30, respectively, and into the inlets 34 and 36, respectively, of the amplifier 32. The power jet 40 will impart an increased velocity to this flow through the central chamber 38 and out through the outlets 42, 44 and 46. Therefore, a strong differential output signal is generated at the outlets 42 and 46, respectively, which will be proportional to the input angular rate A. This output signal can be further amplified and/or utilized to actuate a control system, or the like.

Figure 3:
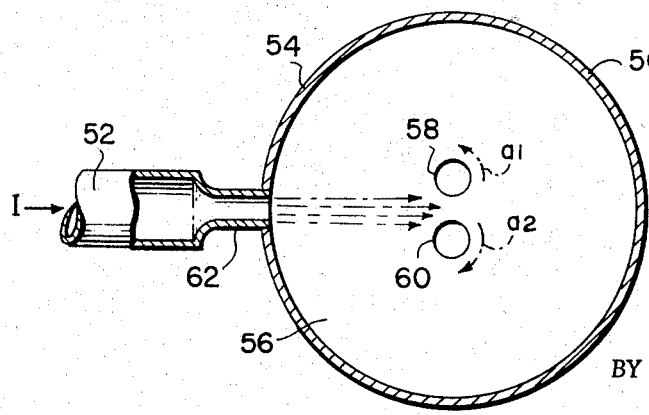
FIG. 3 is a view, similar to FIG. 1, of an alternate embodiment of the present invention.

The embodiment of FIG. 3 shows an alternate embodiment of the present invention. Specifically, an angular rate sensor is shown which consists of a cylindrical housing 50 and an inlet conduit 52. As in the previous embodiment, the cylindrical housing consists of an outer cylindrical wall 54 and a pair of discs, only the lower one 56 being shown. A pair of sink outlets 58 and 60 are provided near the central portion of the disc 56.

In this embodiment, an inlet nozzle 62 is provided between the conduit 52 and the wall 54 of the housing, so that a fluid passed through the conduit 52 and the nozzle 62 at a constant rate is given an initial circumferential velocity in the directions $a_1$ and $a_2$ through the sink outlets 58 and 60, respectively. Therefore, when an angular rate is imparted to the housing 50 in the direction A, the net circumferential velocity through the sink outlet 58 will be $a_1+A$, and the net circumferential velocity through sink outlet 60 will be $a_2-A$. This results in a decreased flow through the sink outlet 58 due to the increase in the circumferential velocity, and an increased flow through the sink outlet 60 due to the decrease in circumferential velocity. This outlet flow can be connected to an amplifier in the same manner as shown in FIG. 2 to provide a strong differential output signal that will be proportional to the input angular rate.

It is therefore seen that the angular rate sensors of the present invention do not require any moving parts, and are therefore simple in operation and relatively low in cost. Furthermore, they are very reliable, and provide a relatively strong, high quality output signal which does not require further stages of amplification.

It is understood that several changes in the above structure and arrangement can be made without departing from the basic inventive concept. For example, only one sink outlet can be provided, in which case a direct measurement of the output flow from the amplifier would be made. This output, of course, would have to be compared with the output flow before the angular rate input, and the output would be sensitive to fluctuations in the supply of fluid to the housing. Also, more than two sink outlets can be provided, in which case the operation would be essentially the same as described in connection with the above embodiments.

Of course, other variations of the specific construction and arrangement of the sensors disclosed above can be made by those skilled in the art without departing from the invention as defined in the appended claims.

What is claimed is:

1. An angular rate sensor comprising a housing adapted to rotate about its axis in response to an angular rate input, said housing having a pair of axially opposed end walls, fluid inlet means connected to said housing for radially introducing fluid therein, a pair of sink outlets disposed in one of said opposed end walls, said outlets being diametrically opposed in radial offset relation with respect to each other and to said axis respectively, means associated with each of said sink outlets for imparting circumferential velocity of opposite sense to said fluid as it passes through said pair of sink outlets respectively, said circumferential fluid velocity corresponding to each sink outlet being differentially effected by rotation of said housing about its axis, the fluid flow rate through sink outlets being inversely proportional to the magnitude of fluid circumferential velocity and means for providing an output signal proportional to the differential fluid flow rate through said pair of sink outlets.

2. The rate sensor of claim 1 further comprising a porous cylinder disposed between said discs, and extending radially inwardly from said outer wall to divide said housing into an outer chamber and an inner chamber, said inlet means extending through said outer chamber, and said sink outlet extending through said inner chamber.

3. The rate sensor of claim 1 wherein said means to impart a circumferential velocity to said fluid comprises a plurality of spiral ridges formed on the floor of said housing and terminating at each of said sink outlets, the spiral ridges corresponding to each outlet extending in opposite directions respectively.

4. The rate sensor of claim 1 wherein said means for providing an output signal comprises a fluid amplifier having a pair of inputs coupled to said pair of sink outlets respectively and being adapted to measure differential flow through said sink outlets.

5. An angular rate sensor comprising a housing adapted to rotate about its axis in response to an angular rate input, said housing having a pair of axially opposed end walls, a pair of sink outlets disposed in one of said opposed end walls, said outlets being diametrically opposed in radial offset relation with respect to each other and to said axis respectively, fluid inlet means connected to said housing, said fluid inlet means comprising a nozzle being adapted to direct a radial stream of fluid substantially intermediately between said pair of radially offset sink outlets for imparting circumferential velocity of opposite sense to said fluid as it passes through said pair of sink outlets respectively, said circumferential fluid velocity corresponding to each sink outlet being differentially effected by rotation of said housing about its axis, and means for providing an output signal proportional to the differential fluid flow rate through said pair of sink outlets.

References Cited
UNITED STATES PATENTS

| | | | |
|---|---|---|---|
| 3,216,439 | 11/1965 | Manion | 137—81.5 |
| 3,276,259 | 10/1966 | Bowles et al. | 73—505 |
| 3,351,080 | 11/1967 | Datwyler et al. | 73—505 |
| 3,372,596 | 3/1968 | Keller | 73—505 |
| 3,436,969 | 4/1969 | Phillips | 73—505 |

JAMES J. GILL, Primary Examiner

H. GOLDSTEIN, Assistant Examiner

U.S. Cl. X.R.

137—81.5